(12) United States Patent
Lv

(10) Patent No.: US 11,982,758 B2
(45) Date of Patent: May 14, 2024

(54) RELAY POINT GENERATION METHOD AND APPARATUS, AND UNMANNED AERIAL VEHICLE

(71) Applicant: AUTEL ROBOTICS CO., LTD., Guangdong (CN)

(72) Inventor: Hao Lv, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 385 days.

(21) Appl. No.: 17/356,682

(22) Filed: Jun. 24, 2021

(65) Prior Publication Data
US 2021/0325503 A1 Oct. 21, 2021

Related U.S. Application Data

(63) Continuation of application No. PCT/CN2019/128061, filed on Dec. 24, 2019.

(30) Foreign Application Priority Data

Dec. 24, 2018 (CN) .......................... 201811583143.4

(51) Int. Cl.
*G01S 5/02* (2010.01)
*G01S 5/26* (2006.01)

(52) U.S. Cl.
CPC .............. *G01S 5/0294* (2013.01); *G01S 5/26* (2013.01)

(58) Field of Classification Search
None
See application file for complete search history.

(56) References Cited

U.S. PATENT DOCUMENTS

2018/0158197 A1   6/2018   Dasgupta et al.

FOREIGN PATENT DOCUMENTS

| CN | 103149939 A |   | 6/2013 |
|----|-------------|---|--------|
| CN | 107168378 A |   | 9/2017 |
| CN | 107992068 A | * | 5/2018 |
| CN | 107992068 A |   | 5/2018 |
| CN | 108010052 A |   | 5/2018 |
| CN | 108445908 A |   | 8/2018 |
| CN | 108549410 A | * | 9/2018 |
| CN | 108549410 A |   | 9/2018 |
| CN | 109508036 A |   | 3/2019 |

OTHER PUBLICATIONS

Extended European Search Report dated Apr. 1, 2022; Appln. No. 19906126.8.
The International Search Report dated Mar. 30, 2020; PCT/CN2019/128061.
First Chinese Office Action dated Feb. 3, 2020; Appln. No. 201811583143.4.

* cited by examiner

*Primary Examiner* — Adolf Dsouza
(74) *Attorney, Agent, or Firm* — Frank Gao, Esq.

(57) ABSTRACT

A relay point generation method includes: predicting a state of a target at a next moment; establishing a search range around the target according to the state of the target at the next moment; performing sampling within the search range, to obtain at least two location sampling points; and determining a relay point of the UAV at the next moment according to the state of the target at the next moment and the at least two location sampling points.

20 Claims, 3 Drawing Sheets

RELAY POINT GENERATION METHOD AND APPARATUS, AND UNMANNED AERIAL VEHICLE

CROSS REFERENCE

This application is a continuation application of International Application No. PCT/CN2019/128061, filed on Dec. 24, 2019, which claims priority of Chinese Patent Application No. 2018115831434, filed on Dec. 24, 2018, which is incorporated herein by reference in its entirety.

BACKGROUND

Technical Field

Embodiments of the present invention relate to the field of unmanned aerial vehicle (UAV) technologies, and in particular, to a relay point generation method and apparatus, and a UAV.

Related Art

UAVs have been widely used to identify and track moving targets. When a UAV is used to track a target, it is necessary to avoid an obstacle while keeping track according to a location and a state of the target. Currently, a path is generally planned according to a real-time location of the target, and then the UAV flies according to the planned path. Because the target is constantly changing in the tracking process, the UAV needs to perform path planning continuously to maintain the tracking state.

In the process of implementing the present invention, the inventor found that the above method for planning a path according to the real-time location of the target has complex algorithms and a relatively large delay.

SUMMARY

An objective of embodiments of the present invention is to provide a relay point generation method and apparatus, and a UAV that have simple algorithms.

According to a first aspect, an embodiment of the present invention provides a relay point generation method, applicable to a UAV, the method including:
  predicting a state of a target at a next moment, where the state of the target at the next moment includes a location and a speed of the target at the next moment;
  establishing a search range around the target according to the state of the target at the next moment;
  performing sampling within the search range to obtain at least two location sampling points; and
  determining a relay point of the UAV at the next moment according to the state of the target at the next moment and the at least two location sampling points.

In some embodiments, the predicting a state of a target at a next moment includes:
  obtaining a speed and acceleration of the target at a current moment; and
  estimating the state of the target at the next moment according to the speed and the acceleration of the target at the current moment.

In some embodiments, the obtaining a speed and acceleration of the target at a current moment includes:
  obtaining a location of the target at the current moment and locations and timestamps of the target at least two moments before the current moment; and obtaining the speed and the acceleration of the target at the current moment according to the location of the target at the current moment and the locations and the timestamps of the target at the at least two moments before the current moment.

In some embodiments, the establishing a search range around the target according to the state of the target at the next moment includes:
  obtaining an initial tracking distance of the UAV; and
  establishing the search range by using the location of the target at the next moment as a sphere center and using the initial tracking distance of the UAV as a radius, where the search range is a hemispherical surface and located above a plane in which the target is located.

In some embodiments, the performing sampling within the search range to obtain at least two location sampling points includes:
  determine a sampling step;
  establishing a coordinate system for the search range, where the coordinate system includes a Z axis and an X axis perpendicular to the Z axis; and
  performing sampling at the sampling step within a range of a $\varphi$ angle with the Z axis and a $\theta$ angle with the X axis respectively, to obtain the at least two location sampling points, where $\varphi \in [0, \pi/2]$ and $\theta \in [0, 2\pi]$.

In some embodiments, the determining a sampling step comprises:
  obtaining resolution of an environment map, where the resolution of the environment map is resolution of an environment map used in a path planning system of the UAV;
  obtaining the initial tracking distance of the UAV; and
  determining a ratio of the resolution of the environment map to the initial tracking distance as the sampling step.

In some embodiments, the determining a relay point of the UAV at the next moment according to the state of the target at the next moment and the at least two location sampling points includes:
  calculating a score of each of the at least two location sampling points; and
  determining a location sampling point having a highest score as the relay point.

In some embodiments, the calculating a score of each of the at least two location sampling points includes:
  calculating the score by using the following formula:

$$S_i = d_i \times \left( \left(1 - \frac{1}{e^v}\right) \cos\theta_i + \cos(\varphi_i - \varphi_{pitch}) \right)$$

where $d_i$ is a distance between an $i^{th}$ location sampling point and a nearest obstacle, $d_i = \min(d_i, d_s)$, $d_s$ is a safety distance threshold, v is the speed of the target at the next moment, $\theta_i$ is an angle between an opposite direction of a speed direction of the target at the next moment and the X axis, $\varphi_i$ is an angle between the $i^{th}$ location sampling point and the Z axis, and $\omega_{pitch}$ is a pitch angle of a camera of the UAV during initial tracking.

In some embodiments, the determining a location sampling point having a highest score as the relay point includes:
  determining an initial search location; and
  performing annular searching within the search range by using the initial search location as a circle center and using integer multiples of the sampling step as radiuses, to obtain the location sampling point having the highest score.

In some embodiments, coordinates of the initial search location are $(\varphi_0, \theta_0)$, $\varphi_0$ being an angle between the Z axis and a connection line from the UAV to the target when a tracking system is started, $\theta_0$ being an angle between the X axis and a connection line from a current location of the UAV to the location of the target at the next moment.

According to a second aspect, an embodiment of the present invention provides a relay point generation apparatus, applicable to a UAV, the apparatus including:

a prediction module, configured to predict a state of a target at a next moment, where the state of the target at the next moment includes a location and a speed of the target at the next moment;

a search range establishment module, configured to establish a search range around the target according to the state of the target at the next moment;

a sampling module, configured to perform sampling within the search range to obtain at least two location sampling points; and a relay point determining module, configured to determine a relay point of the UAV at the next moment according to the state of the target at the next moment and the at least two location sampling points.

In some embodiments, the prediction module is specifically configured to:

obtain a speed and acceleration of the target at a current moment; and estimate the state of the target at the next moment according to the speed and the acceleration of the target at the current moment.

In some embodiments, the prediction module is specifically configured to:

obtain a location of the target at the current moment and locations and timestamps of the target at least two moments before the current moment; and obtain the speed and the acceleration of the target at the current moment according to the location of the target at the current moment and the locations and the timestamps of the target at the at least two moments before the current moment.

In some embodiments, the search range establishment module is specifically configured to:

obtain an initial tracking distance of the UAV; and establish the search range by using the location of the target at the next moment as a sphere center and using the initial tracking distance of the UAV as a radius, where the search range is a hemispherical surface and located above a plane in which the target is located.

In some embodiments, the sampling module is specifically configured to:

determine a sampling step;

establish a coordinate system for the search range, where the coordinate system includes a Z axis and an X axis perpendicular to the Z axis; and perform sampling at the sampling step within a range of a $\varphi$ angle with the Z axis and a $\theta$ angle with the X axis respectively, to obtain the at least two location sampling points, where $\varphi \in [0, \pi/2]$ and $\theta \in [0, 2\pi]$.

In some embodiments, the sampling module is specifically configured to:

obtain resolution of an environment map, where the resolution of the environment map is resolution of an environment map used in a path planning system of the UAV;

obtain the initial tracking distance of the UAV; and determine a ratio of the resolution of the environment map to the initial tracking distance as the sampling step.

In some embodiments, the relay point determining module is specifically configured to:

calculate a score of each of the at least two location sampling points; and determine a location sampling point having a highest score as the relay point.

In some embodiments, the relay point determining module is specifically configured to:

calculate the score by using the following formula:

$$S_i = d_i \times \left( \left(1 - \frac{1}{e^v}\right) \cos\theta_i + \cos(\varphi_i - \varphi_{pitch}) \right)$$

where $d_i$ is a distance between an $i^{th}$ location sampling point and a nearest obstacle, $d_i = \min(d_i, d_s)$, $d_s$ is a safety distance threshold, v is the speed of the target at the next moment, $\theta_i$ is an angle between an opposite direction of a speed direction of the target at the next moment and the X axis, $\varphi_i$ is an angle between the $i^{th}$ location sampling point and the Z axis, and co pitch is a pitch angle of a camera of the UAV during initial tracking.

In some embodiments, the relay point determining module is specifically configured to:

determine an initial search location; and perform annular searching within the search range by using the initial search location as a circle center and using integer multiples of the sampling step as radiuses, to obtain the location sampling point having the highest score.

In some embodiments, coordinates of the initial search location are $(\varphi_0, \theta_0)$, $\varphi_0$ being an angle between the Z axis and a connection line from the UAV to the target when a tracking system is started, $\theta_0$ being an angle between the X axis and a connection line from a current location of the UAV to the location of the target at the next moment.

According to a third aspect, an embodiment of the present invention provides a UAV, including a body, an arm connected to the body, a power system disposed on the arm and a tracking system, a flight control system, a visual system and a path planning system that are disposed on the body, where the path planning system includes a controller, the controller including:

at least one processor; and a memory communicatively connected to the at least one processor;

the memory storing instructions executable by the at least one processor, the instructions being executed by the at least one processor, to cause the at least one processor to be capable of performing the foregoing method.

According to a fourth aspect, an embodiment of the present invention provides a non-volatile computer-readable storage medium, storing computer executable instructions, the computer executable instructions, when being executed by a UAV, causing the UAV to perform the foregoing method.

According to the relay point generation method and apparatus and the UAV provided in the embodiments of the present invention, a state of a target at a next moment is predicted, a search range is established around the target according to the state of the target at the next moment, at least two location sampling points within the search range are obtained, and then a transit relay point of the UAV at the next moment is determined according to the state of the target at the next moment and the at least two location sampling points. It is easier to only plan the transit relay point of the UAV at the next moment than to plan a segment of path, which simplifies algorithms and reduces the delay.

BRIEF DESCRIPTION OF THE DRAWINGS

One or more embodiments are exemplarily described with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely some embodiments of the present invention rather than all of the embodiments. All other embodiments obtained by a person of ordinary skill in the art based on the embodiments of the present invention without creative efforts shall fall within the protection scope of the present invention.

Figure 1:
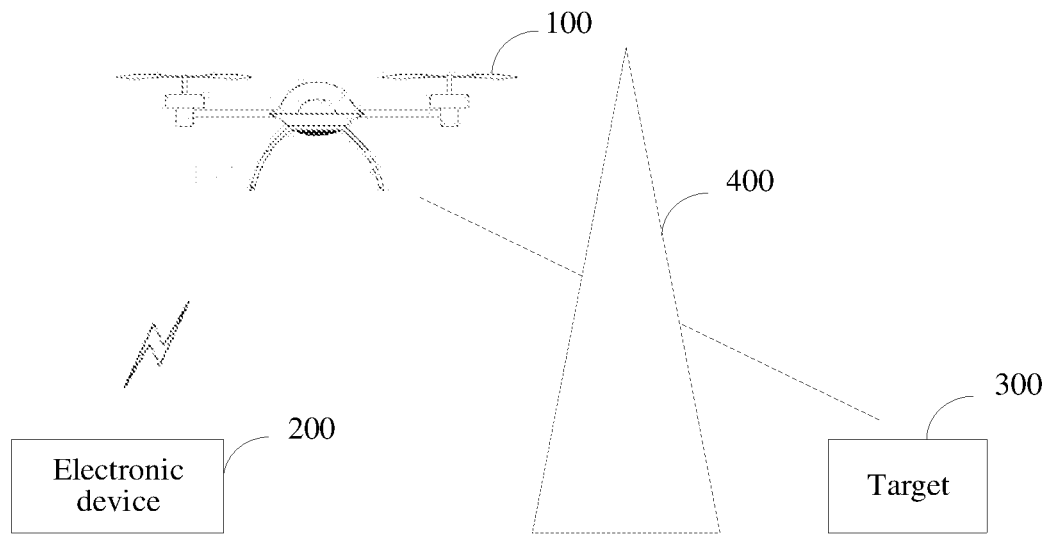
FIG. 1 is a schematic diagram of an application scenario of a relay point generation method and apparatus according to an embodiment of the present invention.

A relay point generation method and apparatus provided in the embodiments of the present invention is applicable to an application scenario shown in FIG. 1. As shown in FIG. 1, the application scenario includes a UAV 100 and a target 300. The UAV 100 may be configured to track the target 300, and when tracking the target 300, the UAV 100 may encounter an obstacle 400. The UAV 100 needs to avoid the obstacle 400 to fly normally while tracking the target 300.

The UAV 100 may be a suitable unmanned aircraft, including a fixed-wing unmanned aircraft and a rotary-wing unmanned aircraft, for example, a helicopter, a quadcopter, and an aircraft having other quantities of rotors and/or rotor configurations. The UAV 100 may be alternatively another movable object such as a manned aircraft, a model airplane, an unmanned airship, or an unmanned hot air balloon. The target 300 may be any suitable movable or non-movable object, including vehicles, people, animals, buildings, mountains, rivers, or the like. The obstacle 400 is, for example, a building, a mountain, a tree, a forest, a signal tower or another movable or non-movable object (only one obstacle is shown in FIG. 1, and there may be more obstacles or no obstacle during actual application).

Figure 2:
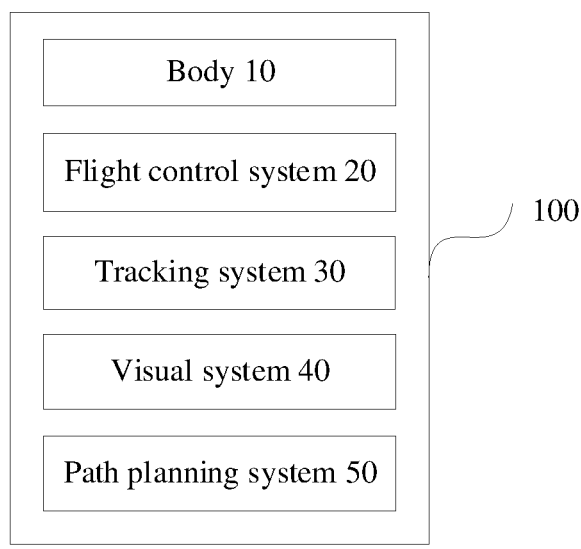
FIG. 2 is a schematic structural diagram of an embodiment of a UAV according to the present invention.

In some embodiments, referring to FIG. 2, the UAV 100 includes a body 10, an arm (not shown in the figure) connected to the body 10, a power system (not shown in the figure) disposed on the arm and a control system disposed on the body 10. The power system is configured to provide a thrust, a lift force and the like for the UAV 100 to fly. The control system is a central nerve of the UAV 100 and may include a plurality of functional units, for example, a flight control system 20, a tracking system 30, a path planning system 50, a visual system 40 and another system having a specific function. Both the tracking system 30 and the visual system 40 include a camera device and a control chip. The tracking system 30 is configured to obtain a location of a tracked target, a tracking distance (that is, a distance between the UAV 100 and the target) and the like. The visual system 40 is configured to provide an environment map and the like. The flight control system 20 includes various sensors (for example, a gyroscope and an accelerometer), and the flight control system 20 is configured to obtain a real-time location of the UAV and control a flight attitude of the UAV. The path planning system 50 is configured to plan a path and instruct the flight control system 20 to control the flight attitude of the UAV 100 to cause the UAV 100 to fly according to a designated path.

During actual application, the flight control system 20 and the path planning system 50 may be disposed inside the body 10, and the tracking system 30 and the visual system 40 may be disposed outside the body 10 and fixed on the body 10. The camera device may be a high-definition digital camera or another camera device. The camera device may be disposed at any suitable location for shooting. In some embodiments, the camera device of the tracking system 30 is mounted at the bottom of the body 10 by using a gimbal, and the camera device of the visual system 40 is disposed on a front portion and/or a lower portion of the body 10. The systems may be set separately. In some embodiments, some or all of the systems may be alternatively integrated in one or more devices.

In some embodiments, the UAV 100 tracks the target according to a target feature. In some embodiments, the target feature is pre-stored in the UAV 100. In some embodiments, the target feature is obtained in another way. Some application scenarios of the UAV 100 further include an electronic device 200, and the target feature may be sent to the UAV 100 by using the electronic device 200. Specifically, the electronic device 200 may display a picture captured by the UAV 100, and a user frames a target in the picture. After a target picture framed by the user is uploaded to the UAV 100, the UAV 100 may extract a target feature according to the framed target picture. A communication connection may be established between the UAV 100 and the electronic device 200 by using wireless communication modules (for example, a signal receiver and a signal transmitter) configured in the UAV and the electronic device respectively for uploading or delivering data/instructions. The electronic device 200 is, for example, a smartphone, a tablet computer, a computer or a remote controller.

In some embodiments, when the UAV 100 plans a path, the path planning system 50 first predicts a state (for example, a location, a speed or acceleration) of a target at a next moment, establishes a search range around the target according to the state of the target at the next moment, obtains at least two location sampling points within the search range, and then determines a suitable transit relay point of the UAV 100 at the next moment according to the state of the target at the next moment and the at least two location sampling points. The flight control system 40 controls, according to the transit relay point determined by the path planning system 50, the UAV 100 to fly to the transit relay point. It is easier for the path planning system 50 to only plan the transit relay point of the UAV 100 at the next moment than to plan a segment of path, which simplifies algorithms. The next moment is, for example, one second, 0.5 seconds or 0.1 seconds after a current moment, or another shorter or longer time after the current moment.

Figure 3:
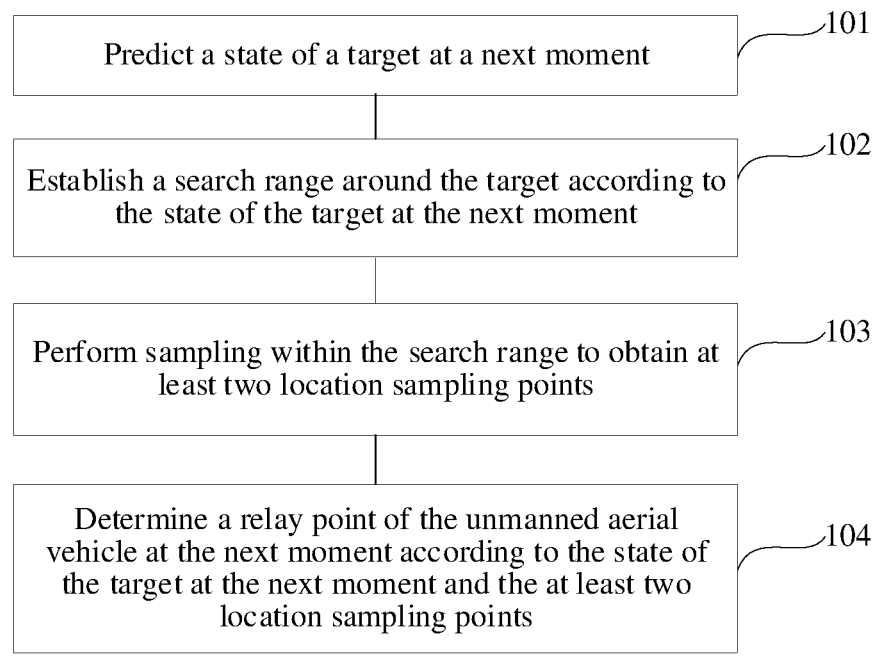
FIG. 3 is a schematic flowchart of an embodiment of a relay point generation method according to the present invention.

FIG. 3 is a schematic flowchart of a relay point generation method according to an embodiment of the present invention. The method may be performed by the UAV 100 in FIG. 1 (specifically, in some embodiments, the method is performed by the path planning system in the UAV 100). As shown in FIG. 3, the method includes the following steps.

101. Predict a State of a Target at a Next Moment.

In some embodiments, moments may be obtained according to a preset duration interval, for example, if the preset duration interval is 0.5 seconds, an interval between adjacent moments is 0.5 seconds. The preset duration interval may be a value selected according to an actual application situation. In this embodiment of the present invention, the next moment is used for representing a moment next to the current moment, a specific value of the next moment being the current moment plus the preset duration interval.

The state of the target is, for example, a location of the target, a speed of the target and acceleration of the target. A movement of the target in a short time may be approximated as a uniform acceleration linear movement with constant acceleration. Therefore, in some embodiments, a location, a speed and acceleration of the target at the current moment may be first obtained, and then the state of the target at the next moment is obtained according to the location, the speed and the acceleration at the current moment.

In some embodiments, the location, the speed and the acceleration of the target at the current moment may be obtained through estimation according to the location of the target at the current moment and locations and timestamps of the target at (N−1) moments before the current moment. The location of the target at the current moment and the locations of the target at the (N−1) moments before the current moment may be obtained by the tracking system 30.

During actual calculation, any suitable coordinate system may be adopted. In this embodiment of the present invention, description is made by using a north east down (NED) coordinate system as an example. There are three coordinate axes in the NED coordinate system, which are a Z axis, an X axis and a Y axis respectively. Target locations of N moments obtained by the tracking system 30 are three-dimensional values, that is, coordinate values on the Z axis, the X axis and the Y axis. Locations, speeds and acceleration of a target at a current moment on the Z axis, the X axis and the Y axis may be estimated respectively according to the coordinate values of the target at the N moments on the axes. Locations and speeds of the target at a next moment on the Z axis, the X axis and the Y axis are obtained according to the locations, the speeds and the acceleration of the target at the current moment on the Z axis, the X axis and the Y axis, and finally values of the three-dimensional location, speed and acceleration of the target at the next moment are obtained.

A process of estimating the location, the speed and the acceleration of the target is described by using one of the axes as an example. The estimation methods of the other two axes are the same.

Assuming that the current moment is $t_{i-1}$, the next moment is $t_i$, a location at each moment is f(t), and a speed at each moment is v(t), a location of a target performing a uniform acceleration linear movement at the next moment is:

$$f(t_i)=f(t_{i-1})+\int_{t_{i-1}}^{t_i}(v_0+at^2)dt \qquad (1)$$

A speed of the target at the next moment is:

$$v(t_i)=v_0+\int_{t_{i-1}}^{t_i}(2a)dt \qquad (2)$$

where $v_0$ is a speed of the target at the current moment, and a is acceleration of the target at the current moment. $v_0$ and a may be obtained through estimation by using locations and timestamps of N moments. Locations f(tk) of the current moment and (N−1) moments before the current moment are obtained by the tracking system 30, where k=i−1, i−2, ..., and i−N, the locations f(tk) (k=i−1, i−2, ..., and i−N) and timestamps i−1, i−2, ..., and i−N of the target at the N moments are substituted into formula (1), and an overdetermined equation may be solved by using the least square method to obtain parameters $v_0$ and a. The location and the speed of the target at the next moment may be obtained by using formula (1) and formula (2), and acceleration of the target at the next moment is also a due to the uniform acceleration linear movement.

A value (for example, 8, 9, 10 or a smaller or larger value) of N may be selected according to an actual application situation. Generally, a smaller N indicates higher sensitivity to a movement change, that is, a time delay between an estimated movement state and an actual movement state is small, but the robustness is poor. Conversely, a larger N indicates better robustness, but the movement sensitivity is poor. During the movement, the current moment and the next moment constantly change. To continuously estimate the movement state of the target and re-calculate the state of the target at the next moment, locations at the N−1 moments before the current moment need to be updated. In some embodiments, a first input first output (FIFO) update policy may be adopted to update the locations of the first N moments, and only N latest locations are maintained.

102. Establish a Search Range Around the Target According to the State of the Target at the Next Moment.

Figure 4:
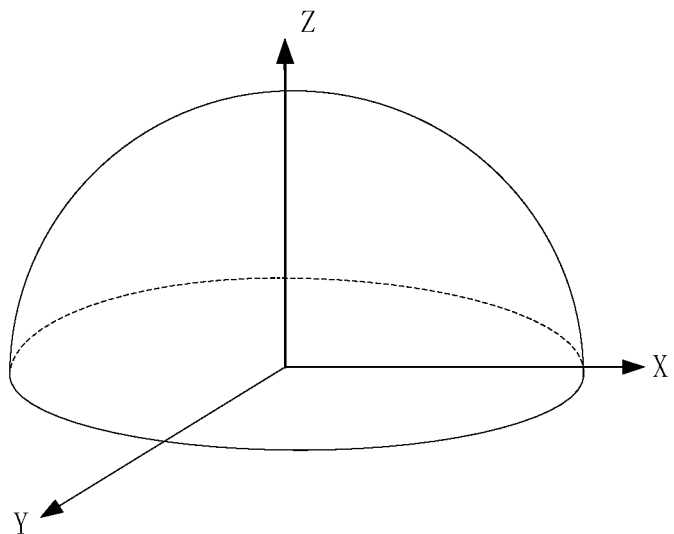
FIG. 4 is a schematic diagram of a search range in an embodiment of a relay point generation method according to the present invention.

The search range is, for example, a part or all of a spherical surface with the location of the target at the next moment as a sphere center and an initial tracking distance of the UAV as a radius. In some examples in which the UAV tracks a target, the UAV only tracks the target over the target. In this embodiment, as shown in FIG. 4, only the upper half of the spherical surface may be selected as the search range, that is, the search range is located above a plane in which the target is located. The initial tracking distance may be preset according to an actual application situation. During working, the initial tracking distance may be provided to the path planning system 50 by the tracking system 30.

103. Perform Sampling within the Search Range to Obtain at Least Two Location Sampling Points.

For example, the search range is a spherical surface, sampling a location search space may be sampling a φ angle and a θ angle at a sampling step within the search range, to obtain a plurality of location sampling points. The φ angle is an angle between the Z axis and a connection line from the location sampling point to a sphere center, and the θ angle is an angle between the X axis and the connection line from the location sampling point to the sphere center. In an embodiment, the UAV tracks the target above the target, a range of the φ angle is [0, π/2], and a range of the θ angle is [0, 2π].

In an actual sampling process, both the φ angle and the θ angle may be sampled from 0 degrees until the φ angle reaches π/2 and the θ angle reaches 2π. For example, first, the φ angle is kept at 0 degrees, and the θ angle is sampled from 0 to 2π at a sampling step; subsequently, the φ angle is kept at 0 degrees plus the sampling step, and the θ angle is sampled from 0 to 2π at the sampling step; then, the φ angle is kept at two sampling steps, and the θ angle is sampled from 0 to 2π at the sampling step, and so on, until the φ angle is kept at π/2, and the θ angle is sampled from 0 to 2π at the sampling step. In this way, a plurality of location sampling points may be obtained.

In some embodiments, the sampling step $\theta_s=L/d0$, L being resolution of an environment map, d0 being the initial tracking distance. In some other embodiments, a smaller step may be alternatively adopted for sampling. In this way, more discrete location sampling points may be obtained, but more location sampling points increase a size of the search space and increase the amount of calculation.

The environment map refers to an environment map used in a path planning system of the UAV. In some embodiments, the environment map is a point cloud map of a surrounding environment of the UAV, the point cloud map generally including location information of feature points in a surrounding environment of the target, for example, location information of an obstacle. The environment map may be obtained by the visual system 40.

104. Determine a Relay Point of the UAV at the Next Moment According to the State of the Target at the Next Moment and the at Least Two Location Sampling Points.

One location sampling point is selected from the plurality of location sampling points as a relay point of the UAV at the next moment. One location sampling point may be selected from the plurality of location sampling points according to the state of the target at the next moment and/or the environment map, to serve as the flight relay point of the UAV 100. For example, distances between location sampling points and obstacles may be obtained according to locations of the obstacles in the environment map, and then a location sampling point with a largest distance from an obstacle closest to the location sampling point is selected as the relay point of the UAV. In this way, it may be ensured that the selected location sampling point is as far away as possible from the obstacle.

In some other embodiments, the location sampling point may be alternatively selected according to a speed of the target in the state of the target, for example, a location sampling point closer to the target is selected as the relay point of the UAV.

In some other embodiments, the location sampling point may be alternatively selected by comprehensively considering the distance between the location sampling point and the obstacle and the speed of the target. In some embodiments, scores of the location sampling points may be calculated by integrating the two factors, and then a location sampling point having a highest score is selected as the relay point of the UAV. Specifically, in some embodiments, the score of the location sampling point may be calculated by using the following formula:

$$S_i = d_i \times \left(\left(1 - \frac{1}{e^v}\right)\cos\theta_i + \cos(\varphi_i - \varphi_{pitch})\right)s \quad (3)$$

where $S_i$ is a score of an $i^{th}$ location sampling point, $d_i$ is a smaller value between a distance from the $i^{th}$ location sampling point to a nearest obstacle and a preset safety distance threshold, that is, $d_i=\min(D_i, d_s)$, $S_i$ is a distance between the $i^{th}$ location sampling point and the nearest obstacle, $d_s$ is the preset safety distance threshold, v is an estimated speed of the target at the next moment, $\theta_i$ is an angle between an opposite direction of a direction of the estimated speed and the X axis, $\varphi_i$ is an angle between the Z axis and a connection line from the $i^{th}$ location sampling point to the sphere center, and $\varphi_{pitch}$ is a pitch angle during initial tracking, that is, a pitch angle of a camera of the UAV during initial tracking.

In formula (3), $d_i$ is used for ensuring that the location sampling point is as far away as possible from the obstacle;

$$\left(1 - \frac{1}{e^v}\right)$$

$\cos\theta_i$ is used for ensuring that a direction of the location sampling point is as consistent as possible with the direction of the estimated speed of the target, to facilitate tracking; and $\cos(\varphi_i - \varphi_{pitch})$ is used for ensuring that the angle between the location sampling point and the Z axis is as consistent as possible with the pitch angle during initial tracking, to facilitate maintaining a stable and consistent tracking state.

Specifically, the location sampling point having the highest score may be obtained from the plurality of location sampling points by searching the location sampling points using an annular search method. It is assumed that an initial search location is $A_i=A_0$ and $A_j=A_0$ remains unchanged. A $B_i$ angle is searched; then locations on an outer circle with a distance of one sampling step from the initial search location are searched (in this case, $A_i$ is $A_0$ plus the sampling step); next, locations on an outer circle with a distance of two sampling steps from the initial location are searched (in this case, $A_i$ is $A_0$ plus two sampling steps), and so on. A location sampling point having a highest score is kept as the final relay point. $A_i$ is an angle between the Z axis and a connection line from a search location to the sphere center, $B_i$ is an angle between the X axis and the connection line from the search location to the sphere center, and coordinates of the initial search location are $(\varphi_0, \theta_0)$, $\varphi_0$ being an angle between the Z axis and a connection line from the UAV to the target when a tracking system is started, $\theta_0$ being an angle between the X axis and a connection line from a current location of the UAV to the location of the target at the next moment. In the embodiment shown in FIG. 4, the search range is still $A_i \in [0, \pi/2]$, and $B_i \in [0, 2\pi]$. The location of the UAV may be obtained by the flight control system 20.

During actual application, the state of the target at the next moment and the environment map around the target need to be in the same reference system. In some embodiments, after the tracking system 30 obtains locations of N moments, the locations of the N moments in the tracking system 30 may be converted into locations of the N moments in a system of the visual system 40 according to a location and an angle of the camera device in the tracking system 30. Values of a location, a speed and acceleration of the target at the next moment obtained according to the locations of the N moments are also in the reference system of the visual system 40. Further, the location may be converted into an absolute location in a world coordinate system. Specifically, Because the environment map obtained by the visual system 40 is centered around the UAV, the location may be converted into the absolute location according to a location of the UAV.

In this embodiment of the present invention, only a transit relay point of the UAV at a first moment instead of a segment of path is planned, which simplifies algorithms and reduces the delay, and a problem that the target is easy to lose can be resolved to a certain extent.

Figure 5:
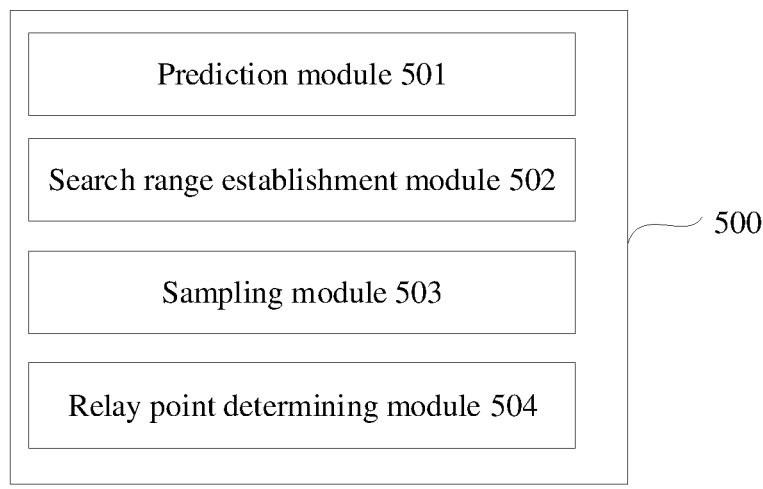
FIG. 5 is a schematic structural diagram of an embodiment of a relay point generation apparatus according to the present invention.

Correspondingly, as shown in FIG. 5, an embodiment of the present invention further provides a relay point generation apparatus. The apparatus is applicable to the UAV shown in FIG. 1, and the relay point generation apparatus 500 includes:

a prediction module 501, configured to predict a state of a target at a next moment, where the state of the target at the next moment includes a location and a speed of the target at the next moment;

a search range establishment module 502, configured to establish a search range around the target according to the state of the target at the next moment;

a sampling module 503, configured to perform sampling within the search range to obtain at least two location sampling points; and a relay point determining module 504, configured to determine a relay point of the UAV at the next moment according to the state of the target at the next moment and the at least two location sampling points.

According to the embodiments of the present invention, a state of a target at a next moment is predicted, a search range is established around the target according to the state of the target at the next moment, at least two location sampling points within the search range are obtained, and then a transit relay point of the UAV at the next moment is determined according to the state of the target at the next moment and the at least two location sampling points. It is easier to only plan the transit relay point of the UAV at the next moment than to plan a segment of path, which simplifies an algorithm and reduces the delay.

In some embodiments, the prediction module 501 is specifically configured to:

obtain a location, a speed and acceleration of the target at a current moment; and estimate the state of the target at the next moment according to the location, the speed and the acceleration of the target at the current moment.

In some embodiments, the prediction module 501 is specifically configured to:

obtain the location of the target at the current moment and locations and timestamps of the target at least two moments before the current moment; and obtain the speed and the acceleration of the target at the current moment according to the location of the target at the current moment and the locations and the timestamps of the target at the at least two moments before the current moment.

In some embodiments, the search range establishment module 502 is specifically configured to:

obtain an initial tracking distance of the UAV; and establish the search range by using the location of the target at the next moment as a sphere center and using the initial tracking distance of the UAV as a radius, where the search range is a hemispherical surface and located above a plane in which the target is located.

In some embodiments, the sampling module 503 is specifically configured to:

determine a sampling step;

establish a coordinate system for the search range, where the coordinate system includes a Z axis and an X axis perpendicular to the Z axis; and perform sampling at the sampling step within a range of a φ angle with the Z axis and a θ angle with the X axis respectively, to obtain the at least two location sampling points, where φ∈[0, π/2] and θ∈[0, 2π].

In some embodiments, the sampling module 503 is specifically configured to:

obtain resolution of an environment map, where the resolution of the environment map is resolution of an environment map used in a path planning system of the UAV;

obtain the initial tracking distance of the UAV; and determine a ratio of the resolution of the environment map to the initial tracking distance as the sampling step.

In some embodiments, the relay point determining module 504 is specifically configured to:

calculate a score of each of the at least two location sampling points; and determine a location sampling point having a highest score as the relay point.

In some embodiments, the relay point determining module 504 is specifically configured to:

calculate the score by using the following formula:

$$S_i = d_i \times \left( \left(1 - \frac{1}{e^v}\right) \cos\theta_i + \cos(\varphi_i - \varphi_{pitch}) \right)$$

where $d_i$ is a distance between an $i^{th}$ location sampling point and a nearest obstacle, $d_i = \min(d_i, d_s)$, $d_s$ is a safety distance threshold, v is the speed of the target at the next moment, $\theta_i$ is an angle between an opposite direction of a speed direction of the target at the next moment and the X axis, $\varphi_i$ is an angle between the $i^{th}$ location sampling point and the Z axis, and $\omega_{pitch}$ is a pitch angle of a camera of the UAV during initial tracking.

In some embodiments, the relay point determining module 504 is specifically configured to:

determine an initial search location; and perform annular searching within the search range by using the initial search location as a circle center and using integer multiples of the sampling step as radiuses, to obtain the location sampling point having the highest score.

In some embodiments, coordinates of the initial search location are $(\varphi_0, \theta_0)$, $\varphi_0$ being an angle between the Z axis and a connection line from the UAV to the target when a tracking system is started, $\theta_0$ being an angle between the X axis and a connection line from a current location of the UAV to the location of the target at the next moment.

It should be noted that, the foregoing apparatus may perform the method provided in the embodiments of the present application, and have the corresponding functional modules for performing the method and beneficial effects thereof. For technical details not illustrated in the apparatus embodiment, reference may be made to the method provided in the embodiments of the present application.

Figure 6:
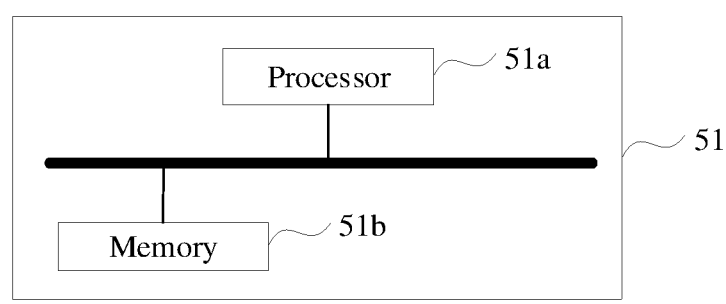
FIG. 6 is a schematic diagram of a hardware structure of a controller of a path planning system in an embodiment of a UAV according to the present invention.

FIG. 6 is a schematic diagram of a hardware structure of a controller 51 of a path planning system 50 in an embodiment of a UAV according to the present invention. As shown in FIG. 6, the controller 51 includes:

one or more processors 51*a* and a memory 51*b*, where one processor 51*a* is used as an example in FIG. 6.

The processor 51*a* and the memory 51*b* may be connected through a bus or in other manners, for example, connected through a bus in FIG. 6.

The memory 51*b*, as a non-volatile computer-readable storage medium, may be configured to store a non-volatile software program, a non-volatile computer-executable program and a module, for example, program instructions/modules corresponding to the relay point generation method in the embodiments of the present application (for example, the prediction module 501, the search range establishment module 502, the sampling module 503 and the relay point determining module 504 shown in FIG. 5). The processor 51*a* runs the non-volatile software program, instructions and modules stored in the memory 51*b*, to implement various functional applications and data processing of the controller, that is, to implement the relay point generation method in the foregoing method embodiments.

The memory 51*b* may include a program storage area and a data storage area. The program storage area may store an operating system, and an application program required by at least one function. The data storage area may store data created according to use of the controller, and the like. In addition, the memory 51*b* may include a high-speed random access memory, and may further include a non-volatile memory, such as at least one magnetic disk storage device, a flash memory device, or another non-volatile solid-state storage device. In some embodiments, the memory 51*b* may optionally include memories remotely disposed relative to the processor 51*a*, these remote memories being connected to the relay point generation apparatus through a network. Examples of the network include, but are not limited to, the Internet, an intranet, a local area network, a mobile communication network, and a combination thereof.

The one or more modules are stored in the memory 51*b*, and when executed by the one or more processors 51*a*, perform the relay point generation method in any of the foregoing method embodiments. For example, perform the foregoing described method steps 101 to 104 in FIG. 3 and implement the functions of the modules 501 to 504 in FIG. 5.

The foregoing product may perform the method provided in the embodiments of the present application, and have the corresponding functional modules for performing the method and beneficial effects thereof. For technical details not illustrated in this embodiment, refer to the method provided in the embodiments of the present application.

The embodiments of the present invention further provide a non-volatile computer-readable storage medium, storing computer executable instructions. The computer executable instructions are executed by one or more processors, for example, one processor 51*a* in FIG. 6, so that the foregoing one or more processors may perform the relay point generation method in any of the foregoing method embodiments, for example, perform the foregoing described method steps 101 to 104 in FIG. 3 and implement the functions of the modules 501 to 504 in FIG. 5.

The foregoing described device embodiments are merely examples. The units described as separate parts may or may not be physically separate, and the parts displayed as units may or may not be physical units, may be located in one position, or may be distributed on a plurality of network units. Some or all of the modules may be selected according to actual needs to achieve the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that, all or some of the processes of the method in the foregoing embodiments may be implemented by a computer program instructing relevant hardware. The program may be stored in a computer-readable storage medium. During execution of the program, the processes of the foregoing method embodiments may be included. The foregoing storage medium may be a magnetic disk, an optical disc, a read-only memory (ROM), a random access memory (RAM) or the like.

Finally, it should be noted that the foregoing embodiments are merely used to describe the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A relay point generation method, performed by an unmanned aerial vehicle (UAV), the method comprising:
    predicting a state of a target at a next moment, wherein the state of the target at the next moment comprises a location and a speed of the target at the next moment;
    establishing a search range around the target according to the state of the target at the next moment;
    performing sampling within the search range to obtain at least two location sampling points; and
    determining a relay point of the UAV at the next moment according to the state of the target at the next moment and the at least two location sampling points;
    wherein the establishing a search range around the target according to the state of the target at the next moment comprises:
    obtaining an initial tracking distance of the UAV; and
    establishing the search range by using the location of the target at the next moment as a sphere center and using the initial tracking distance of the UAV as a radius, wherein the search range is a hemispherical surface and located above a plane in which the target is located.

2. The method according to claim 1, wherein the predicting a state of a target at a next moment comprises:
    obtaining a location, a speed and acceleration of the target at a current moment; and
    estimating the state of the target at the next moment according to the location, the speed and the acceleration of the target at the current moment.

3. The method according to claim 2, wherein the obtaining a location, a speed and acceleration of the target at a current moment comprises:
    obtaining the location of the target at the current moment and locations and timestamps of the target at least two moments before the current moment; and obtaining the speed and the acceleration of the target at the current moment according to the location of the target at the current moment and the locations and the timestamps of the target at the at least two moments before the current moment.

4. The method according to claim 1, wherein the performing sampling within the search range to obtain at least two location sampling points comprises:
   determining a sampling step;
   establishing a coordinate system for the search range, wherein the coordinate system comprises a Z axis and an X axis perpendicular to the Z axis; and
   performing sampling at the sampling step within a range of a φ angle with the Z axis and a θ angle with the X axis respectively, to obtain the at least two location sampling points, wherein φ∈[0, π/2] and θ∈[0, 2π].

5. The method according to claim 4, wherein the determining a sampling step comprises:
   obtaining resolution of an environment map, wherein the resolution of the environment map is resolution of an environment map used in a path planning system of the UAV;
   obtaining the initial tracking distance of the UAV; and
   determining a ratio of the resolution of the environment map to the initial tracking distance as the sampling step.

6. The method according to claim 4, wherein the determining a relay point of the UAV at the next moment according to the state of the target at the next moment and the at least two location sampling points comprises:
   calculating a score of each of the at least two location sampling points; and
   determining a location sampling point having a highest score as the relay point.

7. The method according to claim 6, wherein the calculating a score of each of the at least two location sampling points comprises:
   calculating the score by using the following formula:

$$S_i = d_i \times \left( \left(1 - \frac{1}{e^v}\right) \cos\theta_i + \cos(\varphi_i - \varphi_{pitch}) \right)$$

wherein $d_i$ is a distance between an $i^{th}$ location sampling point and a nearest obstacle, $d_i = \min(d_i, d_s)$, $d_s$ is a safety distance threshold, v is the speed of the target at the next moment, $\theta_i$ is an angle between an opposite direction of a speed direction of the target at the next moment and the X axis, $\varphi_i$ is an angle between the $i^{th}$ location sampling point and the Z axis, and $\varphi_{pitch}$ is a pitch angle of a camera of the UAV during initial tracking.

8. The method according to claim 6, wherein the determining a location sampling point having a highest score as the relay point comprises:
   determining an initial search location; and
   performing annular searching within the search range by using the initial search location as a circle center and using integer multiples of the sampling step as radiuses, to obtain the location sampling point having the highest score.

9. The method according to claim 8, wherein coordinates of the initial search location are $(\varphi_0, \theta_0)$, $\alpha_0$ being an angle between the Z axis and a connection line from the UAV to the target when a tracking system is started, $\theta_0$ being an angle between the X axis and a connection line from a current location of the UAV to the location of the target at the next moment.

10. A relay point generation apparatus, performed by an unmanned aerial vehicle (UAV), the apparatus comprising:
    a memory, configured to store a computer executable method program for generating relay point;
    a processor, configured to invoke the computer executable method program for generating relay point to:
    predict a state of a target at a next moment, wherein the state of the target at the next moment comprises a location and a speed of the target at the next moment;
    establish a search range around the target according to the state of the target at the next moment;
    perform sampling within the search range to obtain at least two location sampling points; and
    determine a relay point of the UAV at the next moment according to the state of the target at the next moment and the at least two location sampling points;
    obtain an initial tracking distance of the UAV; and
    establish the search range by using the location of the target, at the next moment as a sphere center and using the initial tracking distance of the UAV as a radius, wherein the search range is a hemispherical surface and located above a plane in which the target is located.

11. The apparatus according to claim 10, wherein the processor is specifically configured to:
    obtain a location, a speed and acceleration of the target at a current moment; and
    estimate the state of the target at the next moment according to the location, the speed and the acceleration of the target at the current moment.

12. The apparatus according to claim 11, wherein the processor is specifically configured to;
    obtain the location of the target at the current moment and locations and timestamps of the target at least two moments before the current moment; and
    obtain the speed and the acceleration of the target at the current moment according to the location of the target at the current moment and the locations and the timestamps of the target at the at least two moments before the current moment.

13. The apparatus according to claim 10, wherein the processor is specifically configured to:
    determine a sampling step;
    establish a coordinate system for the search range, wherein the coordinate system comprises a Z axis and an X axis perpendicular to the Z axis; and
    perform sampling at the sampling step within a range of a φ angle with the Z axis and a θ angle with the X axis respectively, to obtain the at least two location sampling points, wherein φ∈[0, π/2] and θ∈[0, 2π].

14. The apparatus according to claim 13, wherein the processor is specifically configured to:
    obtain resolution of an environment map, wherein the resolution of the environment map is resolution of an environment map used in a path planning system of the UAV;
    obtain the initial tracking distance of the UAV; and
    determine a ratio of the resolution of the environment map to the initial tracking distance as the sampling step.

15. The apparatus according to claim 13, wherein the processor is specifically configured to:
    calculate a score of each of the at least two location sampling points; and
    determine a location sampling point having a highest score as the relay point.

16. The apparatus according to claim 15, wherein the processor is specifically configured to:
calculate the score by using the following formula:

$$S_i = d_i \times \left( \left(1 - \frac{1}{e^v}\right) \cos\theta_i + \cos(\varphi_i - \varphi_{pitch}) \right)$$

wherein $d_i$ is a distance between an $i^{th}$ location sampling point and a nearest obstacle, $d_i = \min(d_i, d_s)$, $d_s$ is a safety distance threshold, v is the speed of the target at the next moment, $\theta_i$ is an angle between an opposite direction of a speed direction of the target at the next moment and the X axis, $\varphi_i$ is an angle between the $i^{th}$ location sampling point and the Z axis, and $\varphi_{pitch}$ is a pitch angle of a camera of the UAV during initial tracking.

17. The apparatus according to claim 15, wherein the processor is specifically configured to:
determine an initial search location; and
perform annular searching within the search range by using the initial search location as a circle center and using integer multiples of the sampling step as radiuses, to obtain the location sampling point having the highest score.

18. The apparatus according to claim 17, wherein coordinates of the initial search location are $(\varphi_0, \theta_0)$, $\varphi_0$ being an angle between the Z axis and a connection line from the UAV to the target when a tracking system is started, $\theta_0$ being an angle between the X axis and a connection line from a current location of the UAV to the location of the target at the next moment.

19. An unmanned aerial vehicle (UAV), comprising a body, an arm connected to the body, a power system disposed on the arm and a tracking system, a flight control system, a visual system and a path planning system that are disposed on the body, wherein the path planning system comprises a controller, the controller comprising:
at least one processor; and
a memory communicatively connected to the at least one processor;
the memory storing instructions executable by the at least one processor, the instructions being executed by the at least one processor, to cause the at least one processor to be capable of performing the following:
predicting a state of a target at a next moment, wherein the state of the target at the next moment comprises a location and a speed of the target at the next moment;
establishing a search range around the target according to the state of the target at the next moment;
performing sampling within the search range to obtain at least two location sampling points; and
determining a relay point of the UAV at the next moment according to the state of the target at the next moment and the at least two location sampling points;
wherein the establishing a search range around the target according to the state of the target at the next moment comprises:
obtaining an initial tracking distance of the UAV; and
establishing the search range by using the location of the target at the next moment as a sphere center and using the initial tracking distance of the UAV as a radius, wherein the search range is a hemispherical surface and located above a plane in which the target is located.

20. A non transitory computer-readable storage medium, storing computer executable instructions, the computer executable instructions, when being executed by an unmanned aerial vehicle (UAV), causing the UAV to perform the following:
predicting a state of a target at a next moment, wherein the state of the target at the next moment comprises a location and a speed of the target at the next moment;
establishing a search range around the target according to the state of the target at the next moment;
performing sampling within the search range to obtain at least two location sampling points; and
determining a relay point of the UAV at the next moment according to the state of the target at the next moment and the at least two location sampling points;
wherein the establishing a search range around the target according to the the target at the next moment comprises:
obtaining an initial tracking distance of the UAV; and
establishing the search range by using the location of the target at the next moment as a sphere center and using the initial tracking distance of the UAV as a radius, wherein the search range is a hemispherical surface and located above a plane in which the target is located.

* * * * *